April 3, 1934.  J. R. REPLOGLE  1,953,433
MULTIPLE TEMPERATURE REFRIGERATION SYSTEM
Filed Nov. 23, 1931
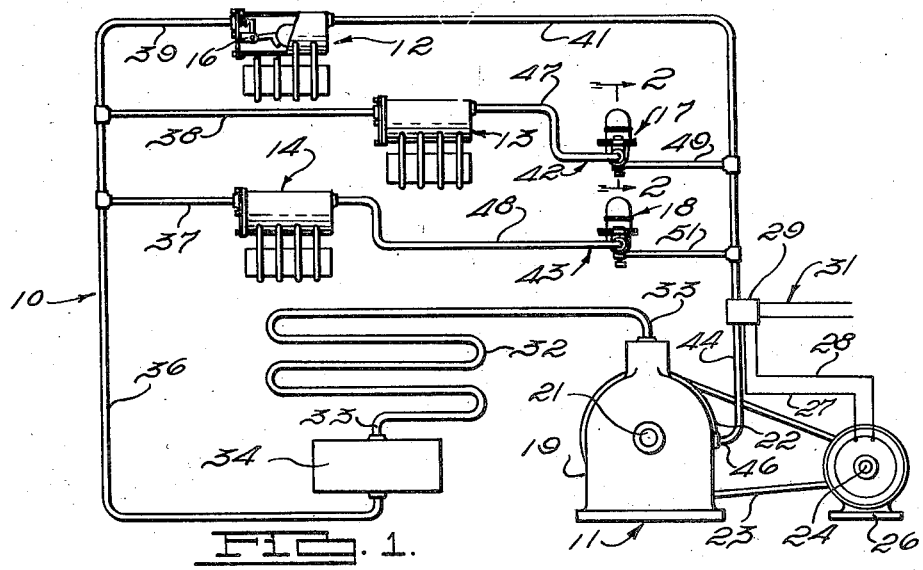
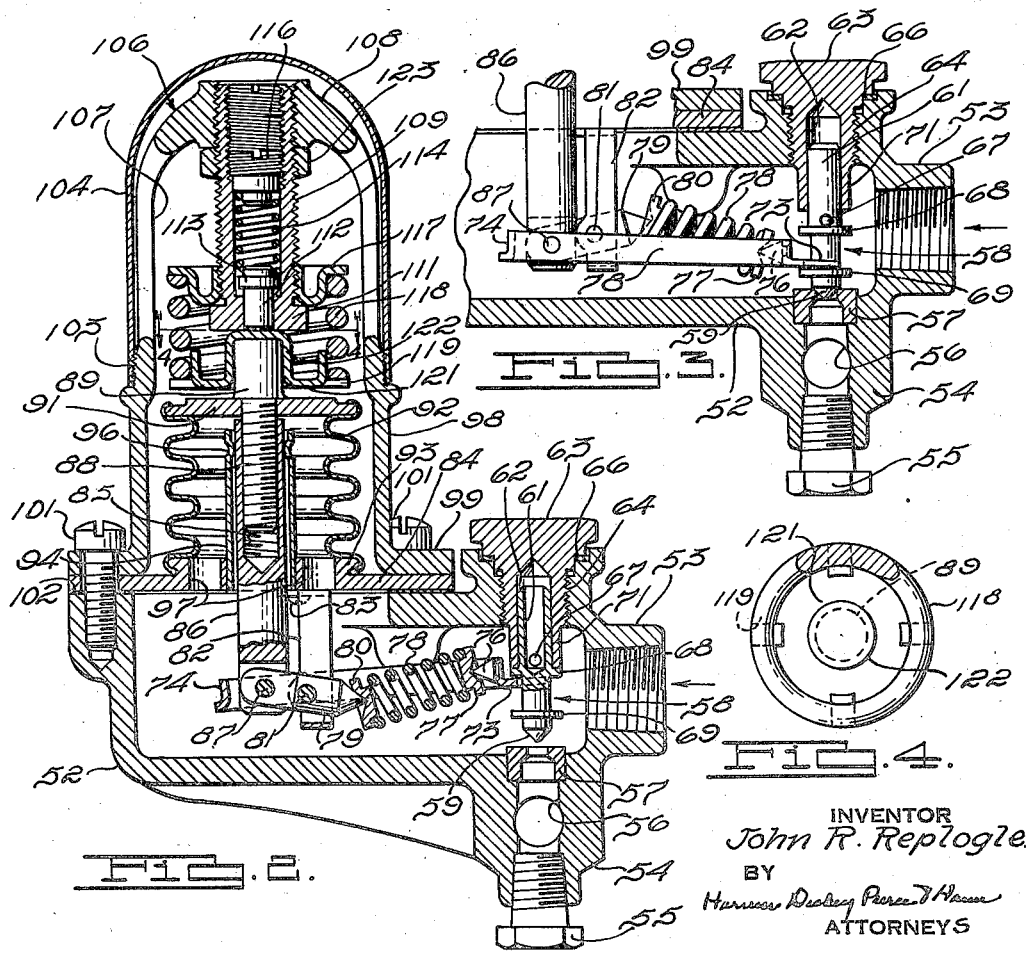
INVENTOR
John R. Replogle.
BY
ATTORNEYS Patented Apr. 3, 1934

1,953,433

UNITED STATES PATENT OFFICE 1,953,433

MULTIPLE TEMPERATURE REFRIGERATION SYSTEM

John R. Replogle, Detroit, Mich., assignor, by mesne assignments, to Copeland Refrigeration Corporation, Mount Clemens, Mich., a corporation of Michigan Application November 23, 1931, Serial No. 576,693

9 Claims. (Cl. 137—153)

This invention relates to refrigeration apparatus, and has particular relation to a valve employed in multiple refrigerating systems which provides for the operation of the different units thereof at different average temperatures.

An object of the invention is to provide a valve which is operable automatically to maintain the temperature of one evaporating unit of a multiple refrigerating system between maximum and minimum limits of temperature variation which may differ widely from the maximum and minimum limits of temperature variations of another evaporating unit in the same system; to provide a valve for such purpose which is economical to manufacture, capable of adjustment such as to render it operable under widely varying conditions, and which will operate positively and efficiently in subjecting one unit of a multiple refrigerating system to a refrigerant evaporating cycle of operations.

The invention comprises a valve casing having a movable wall which operates, in opposition to an adjustable spring and in response to a difference in pressure between the interior of the casing and the atmosphere, to actuate a snap action mechanism contained within the casing which periodically moves a valve controlling the outlet to said casing between its fully open and closed positions. Not only does such snap action and other mechanism move the valve periodically between such two limited positions but it resiliently retains the valve in one position or the other until the fluid pressure to which the casing is subjected has been changed materially.

For effecting such change in fluid pressure, the casing is connected by a suitable conduit to the vapor collecting chamber of one of the evaporating units of a refrigerating system in which a plurality of such units are employed in multiple and in which system it is desired to maintain the average temperature of one of the units between different temperature limits than prevail in another. The outlet opening is connected by a different conduit to a suction line of a condensing unit employed in operating in multiple the several evaporating units of the system. The fluid evaporated in the evaporating unit to which the casing of the aforesaid valve is connected is exhausted periodically through such casing and the valve controlled outlet thereof but only when the temperature, or the pressure corresponding to a temperature within the evaporator, is between certain predetermined maximum and minimum limits which are entirely independent of the maximum and minimum limits of the temperature or pressure of the remainder of the system.

For a better understanding of the invention, reference may now be had to the accompanying drawing forming a part of the specification, in which Figure 1 is a diagrammatical illustration of a multiple evaporating unit refrigerating system operated by a single condensing unit and in which valves constructed in accordance with the principles of this invention are employed.

Fig. 2 is a cross sectional view taken substantially on line 2—2 of Fig. 1, and illustrating the interior structure of one of the temperature controlling valves employed therein.

Fig. 3 is a view of a portion of the structure illustrated by Fig. 2 but showing the valve and toggle mechanism thereof in a different position than is shown by Fig. 2.

Fig. 4 is a transverse sectional view of a portion of the valve structure taken substantially on line 4—4 of Fig. 2.

Referring particularly to Fig. 1, a multiple refrigerating system 10, employed in practicing the invention, comprises a condensing unit 11, a plurality of evaporating units 12, 13 and 14, each having a refrigerant metering device or float valve mechanism similar to that indicated at 16.

While in the present instance the expansion units 12, 13 and 14 consist of evaporators of the so-called flooded evaporator type with which float type metering devices are employed, it is to be understood that any other type of evaporating unit and metering device having a proper rate of pressure variation therein, may be employed.

It is presumed to be desirable in the present instance to operate the evaporating units 12, 13 and 14 at different average temperatures and to accomplish this result the evaporating units 13 and 14 have operatively associated therewith temperature controlling valves 17 and 18, respectively.

For the purpose of illustration, the aforesaid condensing unit 11 embraced in the refrigerating system 10 comprises, a refrigerant compressor 19 having a drive shaft 21 on one end of which a combination fly wheel, driven pulley and fan 22 is secured. A belt 23 operatively associated with the driven pulley 22 is in turn driven by a driving pulley not shown but operatively associated with one end of a drive shaft 24 of an electric motor 26. Conductors 27 and 28 for supplying electrical current to the motor 26 are periodically connected to a power line 31 by a circuit controlling mechanism 29 which is operatively associated with the refrigerating system 10 in a manner hereinafter described. The condensing unit 11 also embraces a refrigerant condenser 32 connected as indicated at 33 to the high side of the compressor 19 and this condenser discharges refrigerant liquid through a coupling indicated at 33 into a liquid refrigerant receiver 34.

The condensing unit receiver thereafter discharges such liquefied refrigerant fluid into the evaporating units 12, 13 and 14, when the metering devices 16 therein are in such position as to permit the discharge of liquid, through a main liquid line 36 and a plurality of branch liquid lines 37, 38 and 39 connected therewith. Refrigerant vapor formed in the evaporating units 12, 13 and 14 is exhausted through branch suction lines 41, 42 and 43, respectively, and a main suction line 44 into the suction side of the compressor 19 indicated at 46.

The controlling mechanism 29 is so associated with the suction line 44 that it will connect the motor 26 with the power line 31 when the pressure in the suction line increases to a predetermined high value and will disconnect such elements when the pressure in the suction line drops to a predetermined lower value.

It is considered preferable to employ the so-called suction pressure type controller in a refrigerating system of this character, although any other similar device or controlling mechanism, in which the pressure of the system or the temperature corresponding to the pressure causes the cycling operation of the condensing unit 11, may be employed if desired.

The float valves 16 in the evaporating units 12, 13 and 14 are so constructed as to admit a limited amount of refrigerant liquid from the branch liquid lines 38, 39 and 37 respectively whenever the liquid level in any of the evaporating units falls below a predetermined height.

It is customary to enclose the evaporating units 12, 13 and 14 in refrigerating compartments having the walls thereof formed of material having relatively good heat insulating properties and the units may be employed either in separate heat insulated compartments where a different degree of refrigeration is required or one or more of them may be employed in the same heat insulated compartment but in regions thereof where different degrees of refrigeration is required.

Each of the branch suction lines 42 and 43 comprises branches 47 and 48 respectively connecting the evaporating units 13 and 14 with temperature controlling valves 17 and 18, respectively, and branches 49 and 51 respectively in turn connecting the temperature controlling valves 17 and 18, respectively, with the main suction line 44.

Each of the temperature controlling valves 17 and 18 (see Fig. 2) has a casing 52 having an inlet 53 to which the conduit sections 47 and 48 are connected, and an angularly disposed outlet 54 to which the conduit sections 49 and 51 are connected. A plug 55 closes one of the two openings in the outlets 54.

The outlet 54 of the casing 52 of either of the valves 17 or 18 comprises a duct 56 at the inner extremity of which an annular seat 57 is inserted. Directly opposite the seat or orifice 57 is an elongated valve element or closure member 58 having a tapering end portion 59 which is adapted periodically to abut the seat 57 and to close the orifice therein. The opposite end of the valve element 58 is tubular in formation, as indicated at 61, and the exterior surface of such portion is slidably disposed in an elongated axial opening 62 which is formed in a specially constructed nut 63 threadably engaging an opening 64 in the casing 52 and opposite the outlet 54.

A gasket 66 inserted between cooperating shoulders formed on the nut 63 and the casing 52 prevents leakage of refrigerant between such elements when the nut 63 is tightened. An opening 67, formed in the tubular portion 61 of the valve element 58 and adjacent the lower extremity thereof, provides means for equalizing the fluid pressure in the interior of the tubular portion and the casing and hence prevents resistance to the movement of the valve which might otherwise result.

Between the tubular portion 61 and the tapering portion 59 the valve element 58 is provided with an annular pair of spaced shoulders or stops 68 and 69, the upper one of which (shoulder 68) is adapted to abut a tubular end portion 71 forming the lower extremity of the nut 63. The length of the portion of the valve element 58 between the shoulder 68 and the tapering portion 79 is such that the orifice in the seat 57 is opened to the maximum extent required when the shoulder 68 abuts the lower end of the tubular portion 71.

Between the shoulders 68 and 69 and on opposite sides of the valve element 58 project the legs of a yoke 73 which extends from one end of an elongated annular yoke 74 positioned longitudinally of the casing 52 and at one side of the valve element 58. At the end thereof adjacent the valve element 58 the yoke 74 is provided with a conical element or fulcrum point 76, the sharpened end of which engages the inner extremity of a conical depression formed in a flanged disc 77. A spring 78 having one end thereof supported by the surface of the disc 77 opposite the depression therein is in turn supported at its opposite end by a similar flanged disc 80 having a conical depression in the opposite surface thereof, the inner extremity of which likewise is engaged by the cone shaped end or fulcrum point of a lever 79. A pin 81, which intermediate its ends pivotally supports an intermediate portion of the lever 79, in turn is supported at its opposite ends between the parallel legs of a U-shaped bracket 82, the ends of which are secured by screws 83 to a plate 84 covering an opening formed in an upper portion of the casing 52.

The end of the lever 79 opposite the fulcrum point thereon is pivotally supported on a pin 87 projecting transversely across a slot in the lower end of a rod 86, the opposite ends of the pin 87 project outwardly beyond the rod 86 and there support the side portions of the yoke 74 adjacent the end thereof opposite the valve element 58. The upper end of the rod 86 is internally threaded, as indicated at 85, to receive the threaded lower end of a stud bolt 88 having an elongated cylindrical head 89 at the upper extremity thereof. A disc 91 also threaded on the stud bolt 88, through an opening formed adjacent the center thereof, is adapted to be tightened against the cylindrical head 89 of the bolt to prevent leakage of refrigerant therethrough.

The outer edge of periphery of the disc 91 has secured thereto one end of a bellows 92, the opposite end of which is secured to an annular flange 93 projecting from the upper surface of the plate 84. An opening at the center of the plate 84 through which the rod 86 projects has secured therein the lower end of an upwardly projecting tubular member 94, the upper end of which is provided with an annular constriction, indicated at 96, in which the upper end of the rod 86 is slidably supported.

The height of the tubular member 94 is such that the upper end thereof will be engaged by the disc 91 after the bellows 92 has been sufficiently collapsed to cause a proper seating of the valve element 58 upon the orifice in the annular valve seat 57.

Between the annular flange 93 and the tubular member 94 the plate 84 is provided with a plurality of openings 97 formed at intervals therein to permit the equalization of pressure between the interior of the bellows 92 and the interior of the casing 52. The bellows 92 is surrounded by a tubular casing 98 having an outwardly projecting flange 99 at the lower extremity thereof which is adapted to rest upon the upper surface of the plate 84, adjacent the edges thereof, while the opposite corresponding surface of the plate 84 rests upon the upper surface of the casing 52 surrounding the previously referred to opening formed therein. Cap screws 101 projecting through the flange 99 and the plate 84 secure such elements rigidly to the casing 52. A compressible gasket 102 inserted between the adjacent surfaces of the plate 84 and the casing 52 prevents leakage of refrigerant therethrough when the cap screws 101 are properly tightened.

The upper end of the casing 98 is threaded, as indicated at 103, to receive the lower end of a cover 104 which surrounds a frame 106 comprising a plurality of arms 107 projecting from the upper edge of the casing 98 and terminating in an internally threaded boss 108. Inside the threaded boss 108 is secured the upper end of an externally threaded sleeve 109, the lower end of which is provided with an integral cap 111 having a centrally and axially formed opening therein in which a pin 112 is slidably disposed. A flange 113 formed on the upper end of the pin 112 is adapted to abut the inside surface of the cap 111 and to prevent the pin 112 from projecting through beyond the cap more than a predetermined distance.

A coil spring 114 confined between the upper surface of the flange 113 and a threaded plug 116, disposed in the threaded interior surface of the sleeve 109, is adapted to urge the pin downwardly against the inside of the cap 111 with a resilient force which varies with the adjustment of the plug 116.

Threadably disposed upon the exterior surface of the threaded sleeve 109 and just above the cap 111, is a flanged annular member or ring 117 which engages the upper end of a coil spring 118 surrounding the cap 111 and the lower end of which is supported by lugs 119 projecting outwardly at intervals from the periphery of an annular disc 121. A central portion of the disc 121 is provided with a cup 122 therein which receives internally thereof the cylindrically formed head 89 of the stud bolt 88.

The disc 121 thus tends to collapse the bellows 92 with a resilient force equal to the work done in compressing the spring 118 between the ring 117 and the disc 121. The force supplied by the spring 118 may be varied to any desired extent simply by rotating the ring 117 to vary its position along the length of the sleeve 109. The adjustment of the spring 118 and also the adjustment of the position of the cap 111, relative to the cylindrical head 89 supporting the opposite end of the spring, may be further adjusted by rotating the threaded sleeve 109 and thus varying its position relative to the internally threaded boss 108. A nut 123 disposed on the threaded exterior surface of the sleeve 109 between the boss 108 and the ring 117 can be tightened against the end of the boss for rigidly securing the sleeve against movement after it has been properly adjusted.

With the elements of structure in the positions indicated in Fig. 2 it is assumed that the internal pressure in the evaporating units 13 or 14 has recently increased to such an extent as to expand the bellows 92 against the compression of the springs 114 and 118 and to throw the snap action mechanism for opening the valve 58. In such position the valve provides an open communication between either one or both of the evaporating units 13 and 14 and the condensing unit 11. Assuming the pressure in the suction line 44 to have previously increased to such an extent as to actuate the controller 29 to cause operation of the condensing unit 11, refrigerant vapor will be continuously exhausted through the casing 52 of one or more of the valves. Such transfer of refrigerant vapor through a valve will gradually reduce the pressure in the evaporating unit to which the valve is attached and a corresponding reduction of pressure in a valve casing will permit a progressive expansion of the springs 114 and 118 which will in turn move the rod 86 thereof downwardly until a point is reached where the axes of the pins 87 and 81 and the fulcrum point 76 are aligned.

Prior to such position of the axes of the pins 81 and 87 and the point 76, the force of the spring 78 was opposed to the downward movement of the rod 86 and also was positioned at such an angle to the fulcrum point 76 as to hold the valve element 58 in an elevated position. Further downward movement of the rod 86 beyond such position, however, will move the axis of the pin 87 across the line between the axis of the pin 81 and the fulcrum point 76 and will change the angular position of the spring 78 (see Fig. 3) in such manner that the force of the spring will be applied in the opposite direction to the fulcrum point 76 and the rod 86. In such event the valve 58 will be quickly moved into its closed position.

When the valve is closed, any further decrease in the pressure within the casing is, of course, prevented by the lack of communication between the casing and the condensing unit. Inasmuch, however, as the casing 52 is still in communication with an evaporating unit of the system, which continues to absorb heat and to evaporate refrigerant liquid, the pressure in the casing 52 will immediately begin to increase and to elevate the rod 86 against the force of the spring 118.

When the mechanism is properly adjusted, however, the upward movement of the rod 86 is not at once opposed by the force of spring 114 because during the downward movement of the rod 86 the flange 113 on the pin 112 moved into a position against the inside of the cap 111 just before or about the time of the alignment of the axes of the pins 87 and 81 and the point 76 which preceded the closing of the valve. Obviously, upon further downward movement of the rod the pin 112 became separated from the cup 122.

When the pressure in the casing 52 increases the cap 122 again engages the pin 112 before the axes of the pins 87 and 81 are aligned with the fulcrum point 76 because, during the opening movement of the valve 58, the line between such points is not the same as the line between the same points upon the closing movement of the valve. However, after the axes of the pins 81 and 87 are aligned with the fulcrum point 76 upon the upward movement of the rod 86, any further increase within the casing will change the angular position of the springs 78 to such an extent as to apply the force thereof in elevating the fulcrum point 76 and in moving the valve element 58 rapidly into an opened position (see Fig. 2 again).

Inasmuch as the spring 78 opposes both the opening and the closing movements of the valve element 58, there will always be a difference in the pressure at which such two movements of the valve will occur. However, as the force of the spring 114 is employed only to oppose the opening movement of the valve and not to oppose the closing movement thereof, the amount of the required difference in pressure between the opening and closing movements of the valve or the differential thereof may be varied by varying the degree to which the spring 114 is compressed.

Inasmuch as the spring 118 is employed during both the opening and the closing movements of the valve 58, the pressures at which both such events occur, or the range of the valve, may be changed by varying the degree of compression of the spring by the adjustment of the nut 117.

In the event the adjustment of any of the springs of the valve is changed to such an extent that the pin 112 is not engaged by the cup 122 between the opening and closing positions of the pins 87 and 81 and the fulcrum point 76 the instant of such engagement may be changed simply by loosening the nut 123 and then varying the position of the sleeve 109 relative to the boss 108.

It is to be understood that in refrigerating systems such as that herein disclosed the temperature of a boiling liquid varies as the vapor pressure in the different evaporating units varies, and hence, in order to maintain the temperature of any evaporating unit between the certain predetermined limits, it is necessary only to maintain the vapor pressure in such unit between corresponding pressure limits.

In the present instance if it is desired to maintain the evaporating unit 12 between certain predetermined relatively low temperature limits, the evaporating unit 13 between certain relatively higher predetermined temperature limits, and the evaporating unit 14 between still higher predetermined temperature limits it is necessary only to properly adjust the controller 29 and the valves 17 and 18.

For example, by a proper adjustment of the spring 118 of the valve 18 a vapor pressure in the evaporating unit 14 may be maintained between relatively high pressure limits, and by a different adjustment of the spring 118 of the valve 17 the vapor pressure in the evaporating unit 13 may be maintained between relatively lower limits. The controller 29 is so adjusted as to maintain the condensing unit 11 in operation until the vapor pressure in the evaporating unit 12 is lower than is possible in either of the evaporating units 13 or 14 or until after the valve elements 58 in both of the valves 17 and 18 are closed against the seats 57. The controller 29 is further adjusted to initiate the operation of the condensing unit 11 at a vapor pressure somewhat higher than that at which it is closed but still lower than the vapor pressure required to open either of the valves 17 or 18.

With such an adjustment of the valves 17 and 18 and the controller 29 the condensing unit 11 will begin its operation whenever the pressure in the evaporating unit 12, and the temperature corresponding thereto, is increased beyond a predetermined value and thereafter the condensing unit will be employed in reducing the vapor pressure in the evaporating unit 12, and the temperature corresponding thereto. During such period, however, the pressure in the evaporating unit 13, for example, may increase beyond the predetermined limit required to open the valve 17 and in such event the condensing unit will also be employed in exhausting vaporized refrigerant from the evaporating unit 13, and in reducing the vapor pressure therein. Likewise, thereafter the vapor pressure in the evaporating unit 14 may increase beyond the predetermined limit required to open the valve 18 and the condensing unit 11 will then be employed in reducing the vapor pressure in all of the evaporating units 12, 13 and 14 and, as a result of such reduction in pressure, the temperatures in all of such evaporating units will be correspondingly reduced.

As the total pressure in the low side of the refrigerating system is gradually reduced by the operation of condensing unit 11, the valves 18 and 17 will close in the respective order of their adjustment as hereinbefore explained and thereafter the pressure in the evaporating unit 12 will be reduced to such an extent that the controller 29 will discontinue the operation of the condensing unit.

Inasmuch as the evaporating unit 12 is set to operate at the lowest temperature of any of the three involved in the system and will probably absorb heat at a greater rate than any of the others, the pressure in the evaporating unit 12 will generally increase faster than will the pressure in the units 13 and 14 and thus will cause operation of the controller 29 to start the condensing unit before either of the valves 17 or 18 have been opened by reason of the increase in pressure in the units 13 and 14.

However, in the event that an unusually heavy load is placed on either of the evaporating units 13 and 14 and this causes the opening of either of the valves 17 or 18 before the evaporating unit 12 has caused the operation of the controller 29, the pressure in the suction line will be increased notwithstanding this fact and the controller will operate to start the condensing unit. Under such circumstances the system will continue to operate as hereinbefore described either with or without the opening of the valve of the remaining unit.

It is to be understood that the structure herein disclosed is not in any sense limited to employment in valves but is applicable for many analogous uses such as for operating switches and other similar devices.

Although for the purpose of illustration, only a single form of the invention has been disclosed herein in detail, it is to be understood that the invention is not so limited but may be embraced in numerous other structures all within the spirit of the invention and the scope of the appended claims.

I claim:

1. A pressure operated valve comprising a casing having a movable wall and an inlet and an outlet opening therein, a valve for one of said openings having an opened and a closed position, a snap action mechanism between said valve and said movable wall for rapidly moving said valve alternately into said opened and closed positions, a spring for operating on said movable wall during a portion of the movement thereof and means preventing the operation of said spring upon said wall during a different portion of the movement thereof.

2. A pressure operated valve comprising a casing having a movable wall and inlet and outlet openings therein, a valve element having opened and closed positions for one of said openings, a snap action mechanism in said casing for quickly moving said valve between said opened and closed positions, said snap action mechanism being operatively associated with the movable wall of said casing, a spring for effecting the operation of said movable wall during a portion of its movement, means for preventing the effect of said spring upon said wall during the remaining portion of the movement thereof and means for adjusting the last means.

3. A pressure operated valve comprising a casing having a movable wall and inlet and outlet openings therein, a valve having opened and closed positions and being operatively associated with one of said openings, a snap action mechanism for quickly moving said valve between said two positions, said snap action mechanism being operatively associated with the movable wall of said casing, a pin beyond said movable wall for engagement therewith, a spring tending to urge said pin into engagement with said movable wall, a stop associated with said pin for preventing movement thereof with the wall before said snap action mechanism has been operated to move said valve from one position to another, means for adjusting the position of said stop and means for adjusting said spring.

4. A pressure operated valve comprising a casing having a movable wall and inlet and outlet openings therein, a valve element having opened and closed positions for one of said openings, a snap action mechanism associated with said movable wall and valve for moving the latter quickly from one position to another, a frame projecting from said casing and having an adjustable sleeve mounted therein, a spring within said sleeve for effecting the position of said movable wall, a spring externally of said sleeve and surrounding the latter also for effecting the position of said movable wall and means associated with said sleeve for effecting the adjustment of both of said springs.

5. A pressure operated valve including a casing having a movable wall and an inlet and an outlet opening, a valve for one of said openings, a member within said casing having one end connected to said valve through a lost motion connection and the other end connected to said movable wall, a lever arranged intermediate the ends of said member and having an intermediate portion thereof pivotally supported by said casing and one end thereof connected to said movable wall, and spring means connecting the opposite end of said lever and said member tending to pivot said member about the first mentioned end thereof in a direction depending upon the position of the last mentioned end of said lever as controlled by said wall.

6. A pressure operated valve including a casing having a movable wall and an inlet and an outlet opening, a valve for one of said openings, a stem for said valve, a pair of axially spaced abutments on said stem, a member within said casing having one end movable between and engageable with said abutments and the other end connected to said movable wall, a lever arranged intermediate the ends of said member and having an intermediate portion thereof pivotally supported by said casing and one end thereof connected to said movable wall, and spring means connecting the opposite end of said lever and said member tending to pivot said member about the first mentioned end thereof in a direction depending upon the position of the last mentioned end of said lever as controlled by said wall.

7. A pressure operated valve including a casing having an inlet and an outlet opening therein, a valve for one of said openings, a movable wall in said casing subject to variations of pressure therein, a snap action mechanism connecting said valve and wall for interrelated movement, spring means constantly urging said wall in one direction, and a second spring means cooperating with said wall during a portion only of the movement thereof between the opened and closed valve positions thereof.

8. A pressure operated valve including a casing having an inlet and an outlet opening therein, a valve for one of said openings, a movable wall in said casing subject to variations of pressure therein, a snap action mechanism connecting said valve and wall for interrelated movements, spring means constantly urging said wall in one direction, and a second spring means cooperating with said wall during a portion only of the movement thereof between the opened and closed valve positions thereof, said second spring means when cooperating with said wall serving to supplement the effect of the first mentioned spring means thereon.

9. A pressure operated valve including a casing having an inlet and an outlet opening therein, a valve for one of said openings, a movable wall in said casing subject to variations of pressure therein, a snap action mechanism connecting said valve and wall for interrelated movement, a spring means constantly urging said wall in one direction, an abutment for said spring means movable to vary the range of pressures required to operate said valve between opened and closed positions, a second spring means cooperating with said wall to vary the effect of the first mentioned spring means on said wall, means for limiting the effect of said second spring means on said wall to a portion only of the movement of said wall between opened and closed valve positions, and an abutment for said second spring means movable to vary the differential of pressures required to operate said valve between opened and closed positions.

JOHN R. REPLOGLE.